United States Patent [19]

Jonason

[11] 4,380,854
[45] Apr. 26, 1983

[54] ASSEMBLY APPARATUS

[75] Inventor: Karl G. Jonason, Vasterås, Sweden

[73] Assignee: Gränges Metallverken Aktiebolag, Västerås, Sweden

[21] Appl. No.: 202,421

[22] Filed: Oct. 30, 1980

[30] Foreign Application Priority Data

Nov. 2, 1979 [SE] Sweden ............................. 7909121

[51] Int. Cl.³ .............................................. B23P 15/26
[52] U.S. Cl. .............................. 29/157.3 A; 228/183; 414/745; 414/746; 29/726
[58] Field of Search ................... 228/183; 29/726, 727, 29/157.3 A, 157.3 B, 157.3 C, 157.3 R; 414/745, 746

[56] References Cited

U.S. PATENT DOCUMENTS

| 1,996,566 | 4/1935 | Boerger | 29/726 |
| 2,006,383 | 7/1935 | Boerger | 29/726 |
| 3,593,836 | 7/1971 | Hill | 414/745 |

FOREIGN PATENT DOCUMENTS

| 28400 | 5/1981 | European Pat. Off. | 29/726 |
| 8000228 | 2/1980 | PCT Int'l Appl. | 29/726 |
| 1449296 | 9/1976 | United Kingdom . | |
| 1525761 | 9/1978 | United Kingdom . | |

Primary Examiner—Francis S. Husar
Assistant Examiner—V. K. Rising
Attorney, Agent, or Firm—Spencer & Kaye

[57] ABSTRACT

An apparatus for assembling cooling tubes and fin elements in the manufacture of heat exchangers, particularly radiators for motor vehicles, comprises stations for feeding the tubes and the fin elements to grooves in a rotatable drum. A tube and a fin element are positioned together in each groove in the drum and are then ejected together at an ejecting station by an expelling device. An advancing means advances the tube and the fin element along a transportation path in an alternate relationship. The tubes and the fin element are soldered to form units during their passage through a soldering station. In a preferred embodiment the feeding station for the fin elements is provided with a separate groove into which the fin elements are fed, before the transfer to the grooved drum.

10 Claims, 3 Drawing Figures

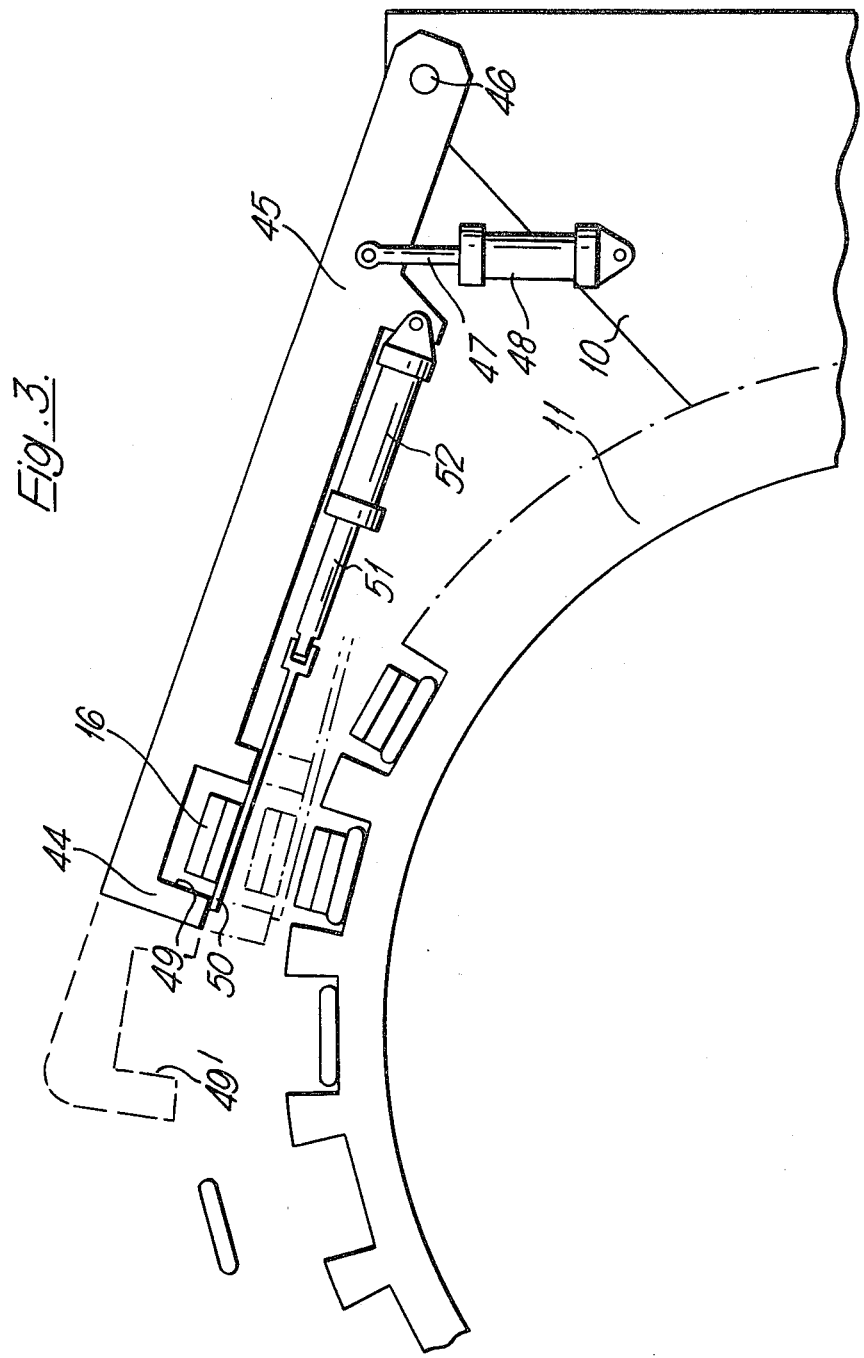

ASSEMBLY APPARATUS

FIELD OF THE INVENTION

This invention relates to an apparatus for assembling a heat exchanger core comprising tubes and associated fin elements in thermal contact with the tubes. Such heat exchanger cores are often used in radiators for use in motor vehicles.

BACKGROUND OF THE INVENTION AND PRIOR ART

It has been proposed to produce a core for a heat exchanger such as a radiator for a motor vehicle, by making an assembly which comprises thin cooling tubes and fin elements in an alternate relationship. The cooling tubes are usually made of copper or brass. The fin elements are then usually manufactured of tapes of copper or brass. During the manufacure of the assembly the cooling tubes and the fin elements are tinned and are then joined together by a soldering process. The fin elements, which in the manufactured assembly consist of corrugated copper or brass tapes, should be manufactured of a very thin material in order to achieve a high efficiency in the heat exchangers. However, if a very thin tape is used for the fin elements it is found that the tape is difficult to handle due to its flexibility and fragility, and this makes the manufacture of the assembly very difficult. Thus, to ensure satisfactory manufacture, it has hitherto been found necessary to make the fin elements of a thicker tape than is desirable for high efficiency of the resultant heat exchanger. Even with the use of such thick tapes it has not been possible to achieve a fully automatic assembly of the cooling tubes and the fin elements. Instead extensive manual work has been required, resulting in high manufacturing costs.

An example of such prior methods are described in British patent specification No. 1,449,296, which discloses a conventional method of constructing a heat exchanger core wherein tubes and fins are manually assembled in a jig, the assembly then being soldered, and which also describes a method in which corrugated fin elements are blown along a passage from a hopper to a station where the fin elements are stacked with tubes. The fin elements must be made of a strip of appropriate thickness to be able to withstand being pneumatically blown along a passage without being damaged. Also the described feeding systems operate slowly, and thus only a slow rate of manufacture can be achieved. British patent specification No. 1,525,761 discloses a similar method in which corrugated fin elements are pneumatically blown along a passage.

International patent application No. PCT/SE79/00153 published under International Publication No. WO80/00228 on Feb. 21, 1980 discloses a further method in which tubes are alternated with intermediate assemblies which comprise two pleated strips which are interconnected by a further flat strip. These intermediate assemblies must be made before the described process is commenced, and the overall procedure is therefore costly.

OBJECT OF THE INVENTION

The main object of the present invention is to provide an assembling apparatus which can be used for the rapid fully automatic assembly of a heat exchanger core comprising cooling tubes and associated fin elements in thermal contact with the tubes, even when the fin elements are made of a very thin material.

SUMMARY OF THE INVENTION

This invention provides an apparatus for assembling a heat exchanger core comprising tubes and associated fin elements in thermal contact with the tubes, said apparatus comprising, a first station for feeding the tubes to an assembly point; a second station for feeding the fin elements to said assembly point; and a transportation path for an assembly comprising the tubes and the fin elements coming from the assembly point in an alternate relationship and means arranged adjacent the transportation path for interconnecting the adjacent tubes and fin elements; wherein said assembly point comprises a groove formed in a rotatable drum which is provided at its periphery with a plurality of said grooves which run in the direction of the axis of the drum and which are dimensioned to contain simultaneously one tube and one fin element, each groove of the drum during the rotation of the drum around its axis passing first the feeding stations at which a tube and a fin element, respectively, are fed into the groove, and then an ejecting station at which the tube and the fin element are ejected together to follow said transportation path.

The tube and fin elements may be interconnected by soldering. The elements may be pre-finned and may be subjected to reacting in the transportation path.

Each tube may be positioned at the bottom of a groove and each fin element may be positioned on top of a respective tube.

The second station is provided with a separate groove into which the fin element is fed, and which is provided with a bottom which can be opened, to transfer of the fin element to the groove of the drum.

This invention also provides a method of assembly a heat exchanger core comprising tubes and associated fin elements in thermal contact with the tubes said method comprising sequentially feeding tubes to adjacent grooves in the periphery of a drum whilst advancing the drum, sequentially feeding fin elements to said grooves so that each groove contains one tube and one fin element, and subsequently sequentially ejecting the tubes and fin elements from said grooves, and causing said tubes and fin elements to follow a transportation path and interconnecting a plurality of adjacent tubes and fin elements on said transportation path. The invention also relates to heat exchanger with a core made by this method.

Due to the fact that the assembling apparatus comprises a rotatable drum provided at its periphery with said grooves the fin elements can be provided with an efficient whilst they are being located between the cooling tubes, so that also flexible and fragile fin elements can be used in a rapidly operating fully automatic assembling process. The disposal of the fin elements between the tubes is further facilitated, when the tubes are placed at the bottom of the grooves and the fin elements are placed on top of the tubes since the tubes then serve as support surfaces for the fin elements during their transportation in the drum as well as during their ejection out of the drum. By the provision of a special groove in a separate head into which the fin elements are fed before they are transferred to a groove of the drum, an improved control and handling of the fin elements is achieved enabling the use of a still thinner material for the fin elements.

Due to the fact that during each ejecting operation one tube together with one fin element is ejected, the ejected elements will always together have constant thickness, even if the fin element is substantially thicker than the tube, which is normally the case. This will facilitate a smooth and continuous ejection and advancing of the alternate tubes and fin elements.

The invention makes it possible to assemble the heat exchangers with a minimum of manual work, thus reducing the manufacturing costs. Furthermore, a very thin material can be used for the fin elements, thereby increasing the efficiency of the heat exchangers and reducing the costs of the material. Finally, a substantial reduction of the weight of the finished heat exchanger unit is obtained.

BRIEF INTRODUCTION TO THE DRAWINGS

The invention will now be described, by way of example, with reference to the accompanying drawings in which:

FIG. 3 is a schematic side elevational view on an enlarged scale of the feeding device for the fin elements of the apparatus shown in FIG. 1.

DESCRIPTION OF A PREFERRED EMBODIMENT

Figure 1:
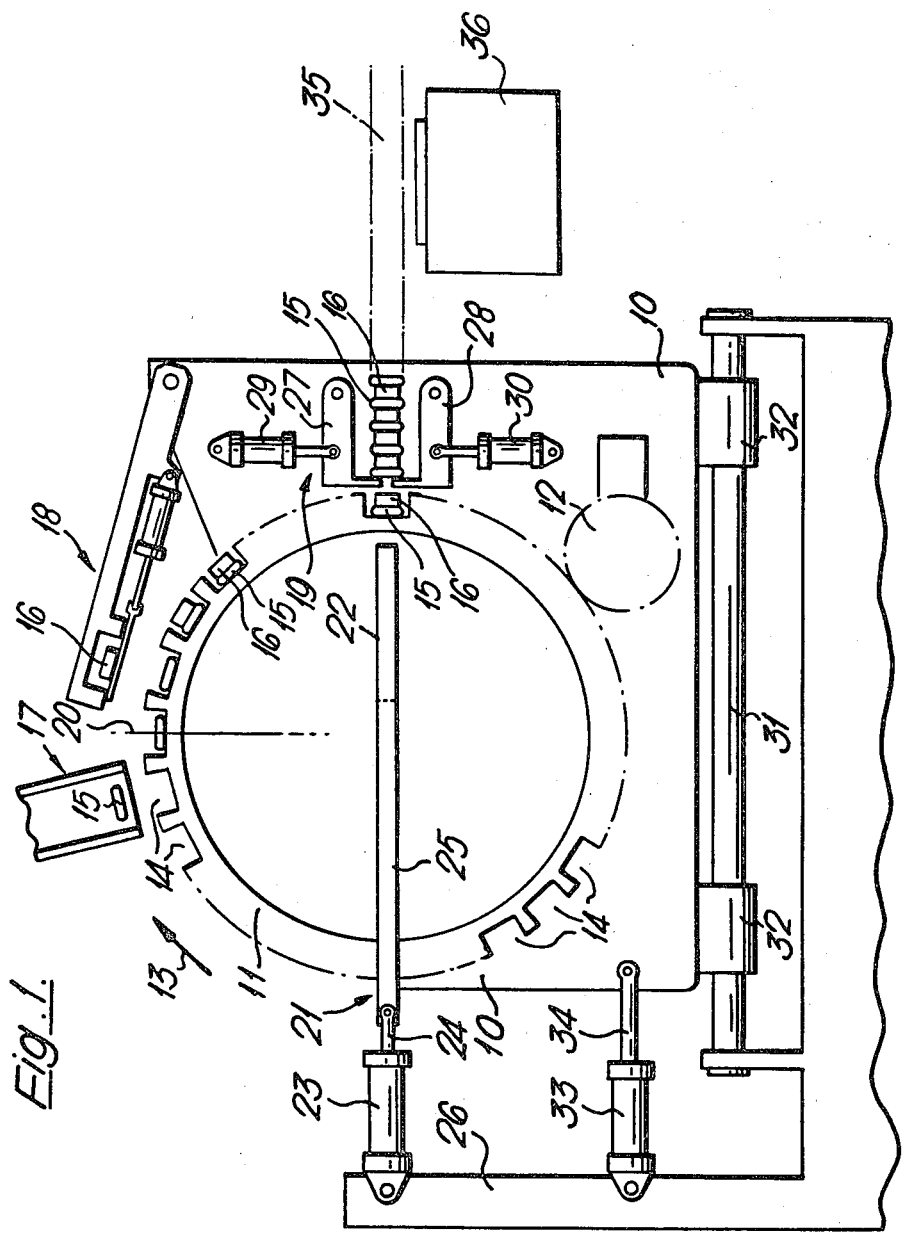
FIG. 1 is a schematic side elevational view of an assembling apparatus in accordance with the invention, and for assembling a heat exchanger core having a rotatable drum.

The apparatus schematically shown in FIG. 1, which is an apparatus for assembling a heat exchanger core, comprises a support frame 10 on which a drum 11 is rotatably mounted in appropriate bearings (not shown). The drum 11 is arranged to be rotated stepwise about its longitudinal axis by a stepping device 12 which may for example comprise a cog wheel driven by a pneumatic piston or a corresponding device. The stepping device 12 acts to drive the drum 11 in a clockwise direction, as indicated by the arrow 13. It is to be appreciated that the stepping device may be of any conventional type and, therefore, it has not been shown or described in detail.

The drum 11 is provided with a plurality of parallel axially extending grooves 14 in the periphery of the drum, the grooves being equispaced. Only a few of the grooves are shown in FIGS. 1 and 3. Each groove has a width and depth such that it can contain one cooling tube 15 and one fin element 16 simultaneously. The construction of the drum will be described hereinafter in greater detail.

Three work stations 17, 18, 19 are positioned about the circumference of the drum. The stations are supported by the support frame 10.

The first work station 17 is intended for feeding tinned tubes 15 into the grooves 14 of drum 11. One tube 15 has been schematically indicated in the station 17. The tubes are normally flat and thus have a substantially rectangular cross section. The tubes 15 are comparatively stiff and resistant and, therefore, the feeding of the tubes 15 to the grooves 14 does not present any problem. A feeding device selected from a large number of a conventional types can be used. For example a device may be used which includes a vertical stack of tubes, and which can deliver one tube each time a groove in the drum is present immediately under the stack.

The second station 18 is intended for feeding tinned flexible fin elements into the grooves 14 in the drum 11, and this station is shown more in detail in FIG. 3 and will be described hereinafter.

In the presently described apparatus, both the first station and the second station are arranged to let the elements which are to be fed into the grooves 14 of the drum 11 drop down into the grooves under the influence of gravity. During the actual feeding operation, these stations must be positioned substantially above the groove 14 into which the respective element is going to drop. Therefore, the stations are positioned adjacent the upper portion of the circumference of the drum on either side of a vertical line 20 passing through the centre of the drum. It is desirable to position the feeding stations 17 and 18 as close as possible to the vertical line 20, because this will ensure that the feeding operation is reliable.

The third station 19 is a removing or ejecting station and comprises a device 21 for removing or ejecting the tube and the fin element which are present in each groove 14 when the groove is advanced to the station 19. The removing or ejecting device consists of an expeller 22, which is been more clearly shown in FIG. 2 and which will be described more in detail below, and an associated driver consisting of a pneumatic cylinder 23 having a piston 24. The piston is attached to two arms 25 of the expeller, the arms extending towards the driver. The pneumatic cylinder 23 is rigidly attached to a stationary wall 26 and, thus, is not displaceable. The movement of the cylinder piston 24 is transferred directly to the expeller 22 to cause the expeller to perform a reciprocating movement.

The tube and the fin element introduced to each groove at the stations 17 and 18 are ejected during the forward movement of the expeller (to the right in FIG. 1). The station 19 also comprises two movable hooks 27, 28, positioned in front of and in close vicinity to the groove 14 which is present at the station 19. The hooks are controlled by means of two pneumatic cylinders 29, 30 attached to the support frame 10 on which the drum is supported. The hooks are controlled so as to open at the moment when a tube and an associated fin element are expelled from the groove of the drum and to close when the expelled elements have been advanced so far that the hooks can be moved so that their free ends are located behind the expelled elements.

The frame 10, that carries the drum 11 is slidably mounted and retained on two parallel guides 31, one of which only is shown in FIG. 1. The guides are parallel with the path of movement of the expeller. The frame 10 is supported on bearings 32 which are slidably mounted on the guides 31. The carriage is caused to perform a reciprocating movement along the guides 31 by means of a pneumatic cylinder 33 which is attached to the stationary wall 26, the piston 34 associated with the cylinder 33 is attached to the frame 10. The reciprocating movement of the frame 10 cooperates with the reciprocating movement of the expeller 22 in such a way that the ejected elements are further advanced to a transportation path 35 by the hooks 27, 28 which are attached to the frame.

The forward movement of the expeller 22 is performed with two speeds during an expelling process. Initially the expeller operates with a high speed so that the expelled elements can join the previously expelled elements, and then the expeller operates at a lower speed corresponding to the desired speed of transportation of the elements on the transportation path to effect such transportation. This provides a smooth and shock-free advancing of the elements on the transportation path.

A heater 36, e.g. a gas burner or an electric heat source, is positioned adjacent the transportation path 35 for heating the tinned tubes and fin elements to such a temperature that the tinning melts, so that the tubes and the fin elements which are pressed together become soldered to each other. The row of soldered elements coming from the heater 36 is divided into units of suitable size by including non-tinned or non-solderable elements (so called dummy elements) between two fin elements at suitable intervals.

Figure 2:
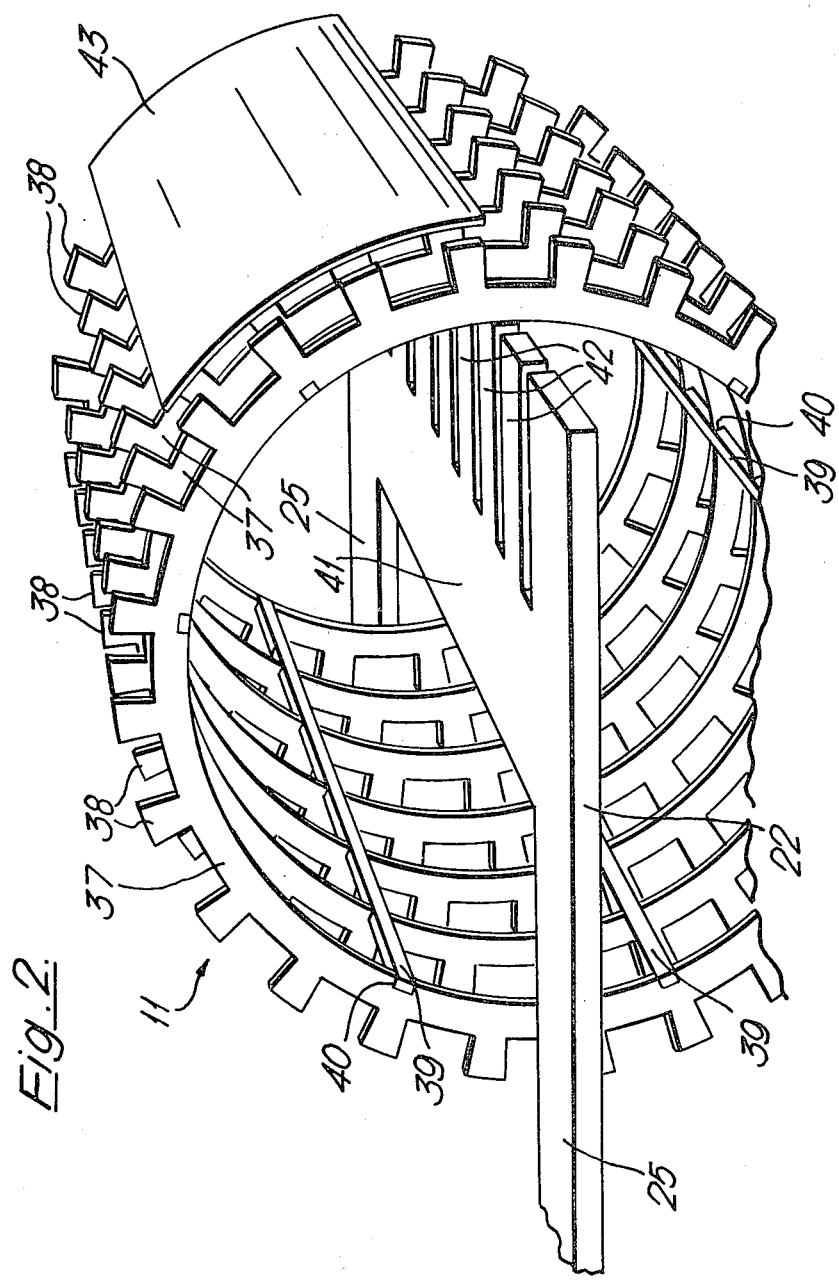
FIG. 2 is a schematic perspective view on an enlarged scale of a portion of the rotatable drum on a larger scale.

A portion of the drum 11 used in the apparatus of FIG. 1 is shown on a larger scale in FIG. 2. The drum is constructed of a number of identical rings 37 each having a plurality of radially extending teeth 38 at their outer periphery. The rings are spaced from each other in axially aligned parallelism and are retained by means of a number of axially extending spacers 39 positioned in grooves 40 formed in the radially inner peripheries of the separate rings. The rings are so positioned in relation to each other that the radially extending teeth 38 form parallel rows which are parallel with the axis of the drum. The spaces between the teeth define the peripheral grooves 14 of the drum into which the tubes and the fin elements are to be fed. The drum is provided with two bearing rings (not shown), one at each end. The bearing rings are rotatably mounted in bearings in the frame 10 by conventional means, so that the drum can rotate about its longitudinal axis, which should be substantially horizontal. By utilising this design the mass of the drum can be kept relatively small.

The expeller 22 is partially located within the drum. The expeller consists of a plate 41 having a number of horizontally extending ejection teeth 42, the number of which is equal with the number of spaces between the spaced rings 37 of the drum 11. The teeth 42 are positioned in alignment with such spaces, so that the teeth can project into the spaces between the rings and thus into the groove 14 at the periphery of the drum which has been advanced to the removing or ejecting station 18 to expel the tube and fin elements present in the groove. The plate 41 of the expeller is provided with the above mentioned two arms 25, which extend from the edge of the plate opposite to the teeth 42 and which are attached to the cylinder 23 of the expelling device.

A curved cover plate 43 is positioned adjacent the periphery of the drum 11 above the removing or ejection station 19. The cover plate has a radius of curvature that is substantially equal to the radius of the periphery of the drum and is positioned adjacent the circumference of the drum, so that the tube and fin elements present in the grooves 14 of the drum 11 can not drop out of the grooves during the rotation of the drum, when the grooves are moved from the feeding stations 17 and 18 to the removing or ejection station 19.

The feeding station for the fin elements is shown in more detail in FIG. 3 and comprises a head 44 which is supported on an extending arm 45. The arm 45 is pivotally mounted at its free end on a shaft 46 that is attached to the support frame 10. The piston 47 of a pneumatic cylinder 48 which is mounted on the support frame 10 is connected to the arm 45, so that by activating the pneumatic cylinder, the arm can be caused to perform a reciprocating movement, so that the head 44 can be brought to a position adjacent the periphery of the drum (indicated in FIG. 3 by dashed lines) and then back to the starting position. The head 44 is provided in the under surface with a U-shaped groove 49 which is open downwards. The downwardly directed opening of the groove is covered by a slidable plate 50 forming a lower bottom cover for the groove. The plate 50 is attached to a piston 51 of a pneumatic cylinder 52 which is attached to the arm 45. The plate 50 can be pulled rapidly aside to uncover the opening of the groove by actuating the cylinder 52. A fin element 16 present in the groove will then drop out from the head 44. The pneumatic cylinders 48, 52 are controlled in such a way that the head 44 is moved downwards towards the drum 11 and the plate 50 is pulled aside, when a groove of the drum is present immediately below the groove 49 of the head 44, so that the fin element present in the groove is caused to drop down into the groove of the drum. The fin element can drop down into the groove of the drum under the influence of gravity, but pressurized air can also be used to speed up or ensure the transfer of the fin element to the groove of the drum.

The provision of a separate groove or box into which the fin element is fed before being transferred to the groove of the drum achieves two very important advantages. Firstly, the walls and the bottom of the groove can be made of a material and in a way such that the friction during the feeding of the fin element into the respective groove in the drum is reduced to a minimum. Secondly, a long period of time is obtained for the movement of the fin element to a position above the drum, because the periods of time during which the drum is rotating can be utilized for this purpose as will now be explained.

The fin elements are usually made of a folded flexible tape. It is therefore highly desirable that this tape can be fed into a groove, the tape thus becoming folded. The tape is then cut to form a fin element of the correct length. If the tape were fed directly into a groove of the drum, the drum would have to be at a standstill during this feeding operation. The horizontal feeding of the tape with the associated folding of the tape to provide a fin in the correct position with regard to the vertical centre axis of the drum is a difficult and therfore time consuming operation. Thus the drum would have to be stationary for a long period of time resulting in a low overall production rate. However in, the presently described device the tape is fed to the groove 49 in the head 44, and the tape is folded within that groove, and then cut to the correct length. When the folded tape is positioned over a groove the plate 50 is withdrawn and the resultant fin element downwardly is performed very rapidly, even though the tape or fin element is very flexible, fragile and difficult to handle. Thus the provision of a separate feed groove for the fin element above the drum gives the apparatus a high operation speed and good reliability. Furthermore, the fact that the separate groove is in a head which is movable with regard to the drum renders the feeding of the fin elements into the groove of the drum more reliable and eliminates the risk that the fin element may be squeezed by the edge of the movable plate, since the head can be retracted to the starting position, which is at a relatively large distance from the periphery of the drum, before the plate 50 is pushed back to close the groove in the drum.

The period of time available for the horizontal feeding of the tape from which the fin element is to be made can be further extended if two parallel grooves are provided in the movable head (a second groove 49' is shown in phantom in FIG .3), so that two fin elements can be simultaneously prepared and positioned above the drum and then can be simultaneously dropped into adjacent separate grooves of the drum. Then, the transfer of fin elements to the drum only has to take place at every second step of the drum, and a period substantially equal to the duration of two steps of the drum is available for the feeding of the tape, and the folding of the tape to make a fin.

The substantial extension of the period of time available for making the fin elements renders the feeding operation much more reliable.

In the embodiment of the invention illustrated in the accompanying drawings and described above, the tube is fed first to the groove of the drum and the fin element is transferred to the groove afterwards, so that the fin element is positioned on top of the tube. This is necessary due to the design of the drum, since the grooves at the periphery of the drum have no continuous bottoms. However, if the drum is so designed that the grooves have continuous bottoms, the fin elements can be fed to the grooves first. In view of the high fragility of the fin elements, it is usually preferable to feed the tube first, because the tube will then give a good support to and a good protection of the fin element during the ejection from the grooves of the drum.

The station for feeding the tubes can be preferably provided with an additional device for enabling the insertion at intervals of dummy elements, i.e. elements which are not intended for soldering to an adjacent fin element. The soldered elements coming from the soldering zone can thus easily be split up into units or sections of a desired size.

It will be appreciated that the fins may be made of very thin metal strip without the fins being damaged during manufacture of the heat exchanger core.

As can be appreciated from FIGS. 1 and 3 the drum of the device is turned one step at a time, the step corresponding to the distance betweeen two adjacent grooves at the periphery of the drum. When a groove is positioned right under the first station, a tube is fed into that groove. The groove is then moved by the rotation of the drum two steps to the second station, where a fin element is fed into the groove and positioned on top of the tube. The groove is thus filled up and is moved by the further rotation of the drum about 90° to the removing or ejecting station, where the tube and the fin element are expelled from the groove by the expelling device. The ejected elements are then advanced by means of the movable hooks 27, 28 and the reciprocating movement of the frame 10 to the transportation path on which the elements then are advanced through the heater for soldering the abutting elements.

The elements are fed to the drum in a horizontal orientation, but are expelled from the drum in a substantially vertical orientation as a result of the 90° rotation of the drum between the feeding station and the expelling station.

While only one embodiment of the invention has been shown and described, it is evident that a large number of different embodiments and modifications of the invention are possible fotto. For example the drum can be designed with adjustable or fixed rings on a shaft, and the number of grooves at the periphery of the drum is variable within wide limits. The separate feed groove for the fin elements can be arranged in many ways. It is not necessary that the groove is movable towards the periphery of the drum, but this feature is very convenient. Furthermore, the bottom of the groove can be designed with one or two movable plates or trap doors which can be opened for the transfer of the fin element to a groove at the periphery of the drum. The movements of the separate means of the apparatus can also be controlled otherwise than by pneumatic means, e.g. by electrical or hydraulic means. Additionally the expeller plate may be located on the exterior of the drum, having claw like teeth that extend into the drum to engage and expel the tubes and fins from the grooves in the drum.

What is claimed is:

1. An apparatus for assembling a heat exchanger core comprising tubes and associated fin elements in thermal contact with the tubes, said apparatus comprising a first means for feeding the tubes to an assembly point and a second means for feeding the fin elements to said assembly point; a rotatable drum provided at its periphery with means defining a plurality of grooves which run in the direction of the axis of the drum and which are dimensioned to contain simultaneously one tube and one fin element, said grooves comprising said assembly point, an ejecting means for ejecting a tube and fin element from each groove and a transportation path for an assembly comprising the tubes and the fin elements coming from the ejecting means in an alternate relationship and means arranged adjacent the transportation path for interconnecting the adjacent tubes and fin elements, each groove of the drum during the rotation of the drum around its axis passing first the first and second means at which a tube and a fin element, respectively, are fed into the groove, and then the ejecting means at which the tube and the fin element are ejected together to follow said transportation path.

2. An apparatus according to claim 1, wherein the first means is arranged to feed each tube to a groove so that the tube is positioned at the bottom of the groove and the second means is arranged to feed each fin element to a groove so that each fin element is positioned on top of a respective tube.

3. An apparatus according to claim 2, wherein the second means is provided with means defining a separate groove into which the fin element is fed, the said separate groove being provided with a bottom which can be opened, when a groove of the drum is present right under the said separate groove, for transfer of the fin element to the groove of the drum.

4. An apparatus according to claim 3, wherein the said separate groove is provided in a reciprocating head arranged to be moved towards the drum, before the bottom of the said separate groove is opened.

5. An apparatus according to claim 3 wherein the second means is provided with means defining two parallel separate grooves having bottoms that can be opened, the mutual distance between the said separate grooves being substantially equal with the distance between two adjacent grooves of the drum, so that two grooves of the drum can each be provided simultaneously with a fin element.

6. An apparatus according to claim 1, wherein an expeller is provided at the ejecting means for expelling a tube and an associated fin element from a respective groove in the drum, the expeller being provided with a plurality of parallel expelling members arranged to be brought to engage the tube in the groove to expel the tube and the associated fin element from the groove of the drum.

7. An apparatus according to claim 1, wherein the first and second means are positioned at the uppermost portion of the circumference of the drum at either side of the vertical line passing through the axis of rotation of the drum.

8. An apparatus according to claim 7, wherein the drum rotates about 90° from the first and second means to the ejecting means and wherein a curved cover plate having a radius of curvature that is substantially equal to the radius of the drum is arranged adjacent the drum above the ejecting means to prevent the tubes and the fin elements lying in the grooves from dropping out of the grooves during the rotation of the drum.

9. An apparatus according to claim 1, wherein the drum comprises a number of parallel co-aligned rings spaced from each other and provided with radially outwardly extending teeth, the teeth being arranged in parallel rows which are parallel with the axis of the drum and which define between them the grooves at the periphery of the drum.

10. A method of assembling a heat exchanger core comprising tubes and associated fin elements in thermal contact with the tubes, said method comprising sequentially feeding tubes to adjacent grooves in the periphery of a drum, whilst advancing the drum, sequentially feeding fin elements to said grooves, so that each groove contains one tube and one fin element, and subsequently sequentially ejecting the tubes and fin elements from said grooves, and causing said tubes and fin elements to follow a transportation path and interconnecting a plurality of adjacent tubes and fin elements on said transportation path.

* * * * *